(12) United States Patent
Gibson (10) Patent No.: US 11,116,196 B2
(45) Date of Patent: Sep. 14, 2021

(54) RIBBED FLASHER FOR USE WHILE FISHING

(71) Applicant: Rapala VMC Corporation, Helsinki (FI)

(72) Inventor: Stephen Elliott Gibson, Columbia, SC (US)

(73) Assignee: Rapala VMC Corporation, Helsinki (FI)

( * ) Notice: Subject to any disclaimer, the term of this patent is extended or adjusted under 35 U.S.C. 154(b) by 79 days.

(21) Appl. No.: 16/145,314

(22) Filed: Sep. 28, 2018

(65) Prior Publication Data
US 2020/0100485 A1 Apr. 2, 2020

(51) Int. Cl.
*A01K 91/06* (2006.01)
*A01K 91/08* (2006.01)
*A01K 85/10* (2006.01)

(52) U.S. Cl.
CPC .......... *A01K 91/065* (2013.01); *A01K 85/10* (2013.01); *A01K 91/08* (2013.01)

(58) Field of Classification Search
CPC ........ A01K 85/00; A01K 85/12; A01K 85/14; A01K 91/08
USPC ............. 43/43.13, 42.5, 42.51, 42.52, 42.11, 43/42.12, 42.16, 42.19, 42.2, 42.46, 43/42.47; D22/129, 131
See application file for complete search history.

(56) References Cited

U.S. PATENT DOCUMENTS

| | | | | |
|---|---|---|---|---|
| 2,002,117 A * | 5/1935 | Lavitt | ............. | A01K 85/12 43/42.12 |
| 2,058,121 A * | 10/1936 | Allen | ............. | A01K 85/14 43/42.5 |
| 2,214,266 A * | 9/1940 | Haury | ............. | A01K 85/14 43/42.52 |
| 2,236,023 A * | 3/1941 | Turner | ............. | A01K 85/14 43/42.12 |
| 2,562,743 A * | 7/1951 | Schindler | ............. | A01K 85/14 43/42.12 |
| 2,608,787 A * | 9/1952 | Krogue | ............. | A01K 85/14 43/42.51 |
| 2,623,319 A * | 12/1952 | Helwig | ............. | A01K 85/14 43/42.12 |
| 2,891,344 A * | 6/1959 | Hottowe | ............. | A01K 91/065 43/42.5 |
| 2,942,371 A * | 6/1960 | Johnson | ............. | A01K 73/045 43/9.7 |
| 3,056,228 A * | 10/1962 | Stackhouse | ............. | A01K 91/065 43/42.51 |
| 3,260,011 A * | 7/1966 | Reamy | ............. | A01K 85/16 43/42.09 |
| 3,439,443 A * | 4/1969 | Weimer | ............. | A01K 85/12 43/42.12 |
| 3,656,253 A * | 4/1972 | Gaunt | ............. | A01K 91/065 43/42.33 |
| 3,673,727 A * | 7/1972 | Bauer | ............. | A01K 85/14 43/42.5 |

(Continued)

*Primary Examiner* — Joshua J Michener
*Assistant Examiner* — Arfan Y. Sinaki
(74) *Attorney, Agent, or Firm* — Dority & Manning, P.A.

(57) ABSTRACT

A flasher including at least one rib elevated above the surface of the middle plate portion of the flasher is provided. The rib(s) may exaggerate the movement of the flasher when pulled through water, when compared to an otherwise identical flasher without the rib(s).

18 Claims, 7 Drawing Sheets

(56) References Cited

U.S. PATENT DOCUMENTS

| | | | | |
|---|---|---|---|---|
| 4,041,636 | A | * | 8/1977 | Folker .................... A01K 91/06 43/42.31 |
| 4,122,624 | A | * | 10/1978 | Smith .................... A01K 85/14 43/42.33 |
| 4,201,006 | A | * | 5/1980 | Wetherald ............. A01K 85/00 43/42.06 |
| 4,735,012 | A | * | 4/1988 | Smith .................... A01K 85/14 43/42.12 |
| 4,936,042 | A | | 6/1990 | Causey |
| 6,279,260 | B1 | * | 8/2001 | Farr ....................... A01K 91/06 43/42.5 |
| 6,493,984 | B1 | * | 12/2002 | Bechhold ............. A01K 91/065 43/42.46 |
| 6,655,074 | B2 | * | 12/2003 | Pentland ............... A01K 91/06 43/42.5 |
| D515,655 | S | * | 2/2006 | Bechhold .................... D22/129 |
| 2005/0252069 | A1 | * | 11/2005 | Pool ...................... A01K 91/065 43/17.1 |
| 2013/0276349 | A1 | * | 10/2013 | Tigner ................... A01K 85/12 43/42.19 |
| 2018/0288989 | A1 | * | 10/2018 | Cooper ................. A01K 85/12 |

\* cited by examiner

RIBBED FLASHER FOR USE WHILE FISHING

FIELD OF TECHNOLOGY

The present invention is directed to ribbed flashers for use while fishing, along with their methods of manufacture and use.

BACKGROUND

Sport fishing is enjoyed around the world. From fresh water to salt water, a wide variety of fish species exist. Fishermen employ a variety of equipment and tackle depending upon the water being fished, the time of day, the species of fish sought, personal choice, and many other factors. A fishing lure, sometimes referred to as an artificial lure, is frequently a part of such equipment and tackle.

The flasher is a popular element in a trolling setup, particularly when salmon and/or trout fishing. When salmon and trout feed on schooled bait fish (e.g., herring), the salmon/trout usually slashes into the school and slashes with its tail to cripple herring within the school. Then, the salmon trout goes back to feed on the crippled herring in the water that may be distinguished from other bait fish by there twisting irregular pattern. In an effort to entice salmon and trout to bite a lure, flashers may be utilized to cause the lure to imitate the action of such a wounded bait fish.

Flashers can be used on the actual fishing line, attached directly to the downrigger cannonball, or placed on the downrigger wire. Typically, a flasher is a flat elongated body (e.g., metal or plastic) with reflective side(s) which has an upturned edge on its upstream end. As the flasher is pulled through the water, it tends to rotate about its point of connection to the fishing line to create a flashing effect to attract fish to the lure secured to the downstream end of the flasher. Flashers may be trolled in front of the fishing lure to resemble an adult fish (e.g., a trout or salmon) swimming and slashing rapidly as if feeding on a school of bait fish. This movement attracts nearby fish to the flasher, as it resembles a feeding frenzy through visual and vibration cues in the water which can be sensed by nearby fish.

While the use of flashers have become popular, there is an ongoing need in the art for an improved flasher to attract fish to bite a trailing lure or bait.

BRIEF DESCRIPTION

Aspects and advantages will be set forth in part in the following description, or may be obvious from the description, or may be learned through practice of the invention.

In one embodiment, a flasher is provided that may include an elongated body defining a first surface on a first side of the elongated body and a second surface on a second side of the elongated body that is opposite of the first side. The elongated body may have: a leading lip defining an upstream edge of the elongated body, a trailing lip defining a downstream edge of the elongated body, and a plate positioned between the leading lip and the trailing lip with the plate defining a length in a longitudinal direction along a center line of the plate from the leading lip to the trailing lip. The flasher may also include a first rib elevated above the first surface of the plate and extending in a first direction that is within 10° of the longitudinal direction: and a second rib on the plate and extending in a second direction that is within 10° of the longitudinal direction. In one embodiment, the second rib may be elevated above the first surface.

The first direction and/or second direction may be substantially parallel to the longitudinal direction. The first rib and/or the second rib may extend at least 50% of the length of the plate. The first rib and the second rib may have respective heights above the first surface and/or respective shapes that are substantially identical to each other. In one particular embodiment, each of the first rib and the second rib may define a cavity in the second surface.

An opening may be defined within the plate of the elongated body. In such an embodiment, the first rib may be positioned on the plate between the opening and a first side edge of the plate, and/or the second rib may be positioned on the plate between the opening and the second side edge of the plate. A spinner may be rotatably attached to the elongated body and positioned within the opening defined within the plate.

At least one tab may extend from the leading lip, such as from the from the first surface of the leading lip. For example, the at least one tab may be positioned an angle of about 30° to about 60° with respect to the longitudinal direction.

A method of fishing is also provided for using the flasher, such as described herein. In one embodiment, the may include: attaching the leading lip of the flasher to a fishing line; attaching the trailing lip of the flasher to a leader line, wherein the leader line is connected to a fishing bait or lure; and pulling the fishing line through a body of water.

These and other features, aspects and advantages will become better understood with reference to the following description and appended claims. The accompanying drawings, which are incorporated in and constitute a part of this specification, illustrate embodiments of the invention and, together with the description, serve to explain certain principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended Figs., in which.

Repeat use of reference characters in the present specification and drawings is intended to represent the same or analogous features or elements of the present invention.

DETAILED DESCRIPTION OF PARTICULAR EMBODIMENTS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

A flasher is generally provided, along with methods of its manufacture and use. Generally, the flasher includes at least one rib elevated above the surface of the middle plate portion of the flasher. For example, a pair of ribs may be positioned proximate to both sides of the middle plate portion of the flasher (e.g., on either side of an opening within the middle plate portion, if present). Without wishing to be bound by any particular theory, it is believed that the rib(s) may exaggerate the movement of the flasher when pulled through water, when compared to an otherwise identical flasher without the rib(s). For example, the ribbed flasher may have a circular movement through the water that is faster than the circular movement of the otherwise identical flasher without the rib(s), when both are pulled through the water at identical conditions (speed, line length, etc.).

Referring to the exemplary embodiment shown in FIGS. 1-8, the flasher 10 includes an elongated body 12 defining a first surface 14 on a first side 15 of the elongated body 12 and a second surface 16 on a second side 17 of the elongated body 12 that is opposite of the first side 15. In one embodiment, the elongated body 12 has a length-to-width ratio of about 3:1 to about 10:1. The elongated body 12 may be formed from a plastic material (e.g., molded plastic), a metal material (e.g., stamped metal plate), or other suitable material having sufficient strength to withstand the connection between a fishing line to a leader line during fishing. Either or both of the first surface 14 and the second surface 16 may include designs as desired to attract fish, such as reflective materials.

Generally, the elongated body 12 has a leading lip 18 defining an upstream edge 19 of the elongated body 12, a trailing lip 20 defining a downstream edge 21 of the elongated body 12, and a plate 22 positioned between the leading lip 18 and the trailing lip 20. As most clearly shown in FIG. 5, the leading lip 18 forms a first angle α with the plate 22 at the first bend 24, and the trailing lip 20 forms a second angle β with the plate 22 at the second bend 26. The first angle α may be, for example, about 125° to about 175° (e.g., about 140° to about 170°), and the second angle may be, independently, about 125° to about 175° (e.g., about 140° to about 170°). In particular embodiments, the first angle α and the second angle β are within about 5° of each other (i.e., the first angle α is plus or minus 5° from the second angle β and may be identical to each other in certain embodiments.

The plate 22 defines a length L in a longitudinal direction (denoted as y-direction in FIGS. 3 and 4) along a center line C of the plate 22 from the leading lip 18 to the trailing lip 20 (e.g., from the first bend 24 to the second bend 26). Conversely, the plate 22 defines a width in a lateral direction (denoted as x-direction in FIG. 3) from the first side edge 28 to the opposite, second side edge 30 of the plate 22. In one embodiment, the width of the plate 22 is substantially constant throughout the plate 22 due to the first side edge 28 being substantially parallel to the second side edge 30. Alternatively, the width may vary as the first side edge 28 and the second side edge 30 may not be parallel along the length of the plate 22.

In the embodiment shown in FIGS. 1-8, a pair of ribs (i.e., a first rib 32 and a second rib 34) are elevated above the first surface 14 of the plate 22. For example, the first rib 32 extends in a first direction that is within 10° of the longitudinal direction y. In one particular embodiment, the first direction is substantially parallel to the longitudinal direction and/or substantially parallel to the first side edge 28. The first rib 32 may extend at least 50% of the length L of the plate 22, such as about 65% to about 95% of the length L of the plate 22. Similarly, the second rib 34 extends in a second direction that is within 10° of the longitudinal direction y. In one particular embodiment, the second direction is substantially parallel to the longitudinal direction and/or substantially parallel to the second side edge 30. The second rib 34 may extend at least 50% of the length L of the plate 22, such as about 65% to about 95% of the length L of the plate 22.

In the embodiment shown, the second rib 34 is elevated above the first surface 14 of the plate 22, such that the first rib 32 and the second rib 34 are elevated in the same direction away from the plate 22. The first rib 32 and the second rib 34 may have respective heights above the first surface 14 that are substantially identical to each other. In one embodiment, the first rib 32 and the second rib 34 have respective shapes that are substantially identical to each other.

Without wishing to be bound by any particular theory, it is believed that the first rib 32 and the second rib 34, when both extend from the same surface (e.g., the first surface 14), they interact together with water to exaggerate the circular motion of the flasher 10 as it is pulled through water. For example, in this embodiment, the first rib 32 and second rib 34 may increase the speed of the flasher with respect to its circular motion when compared to an otherwise substantially identical flasher 10 (but for the presence of the first and second ribs 32,34) pulled through the water in a substantially identical manner. That is, a flasher having the first rib 32 and second rib 34 may have a revolutions per minute (RPM) that is greater than the RPM of the otherwise substantially identical flasher 10 (but for the presence of the first and second ribs 32,34) pulled through the water in a substantially identical manner.

However, in other embodiments, the second rib 34 may be elevated from the second surface 16 of the plate 22 such that the first rib 32 and second rib 34 extend in opposite directions from the plate 22.

Figure 1:
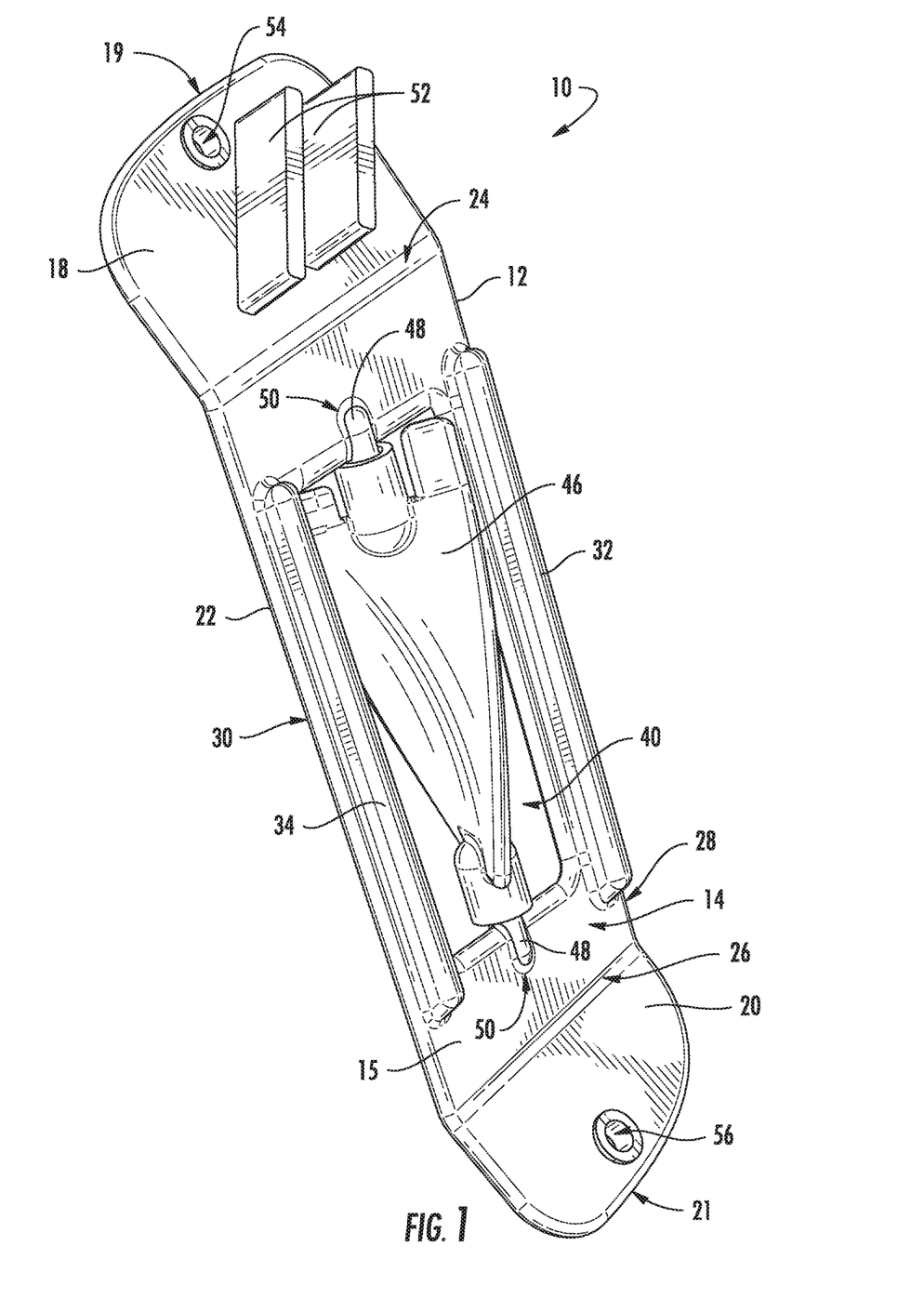
FIG. 1 shows a perspective view of an exemplary flasher according to one embodiment of the present invention.
Figure 2:
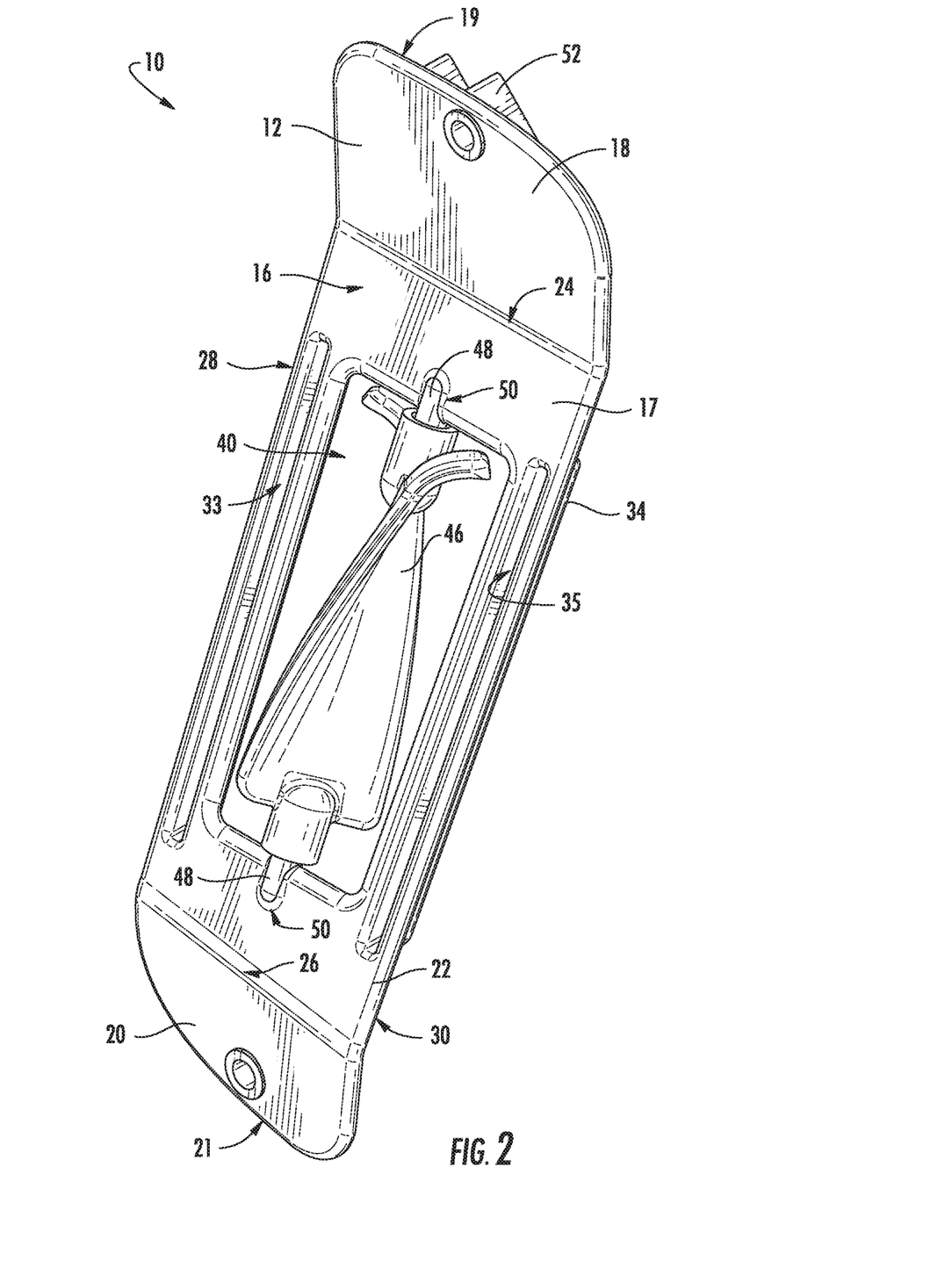
FIG. 2 shows another perspective view of the exemplary flasher of FIG. 1.
Figure 3:
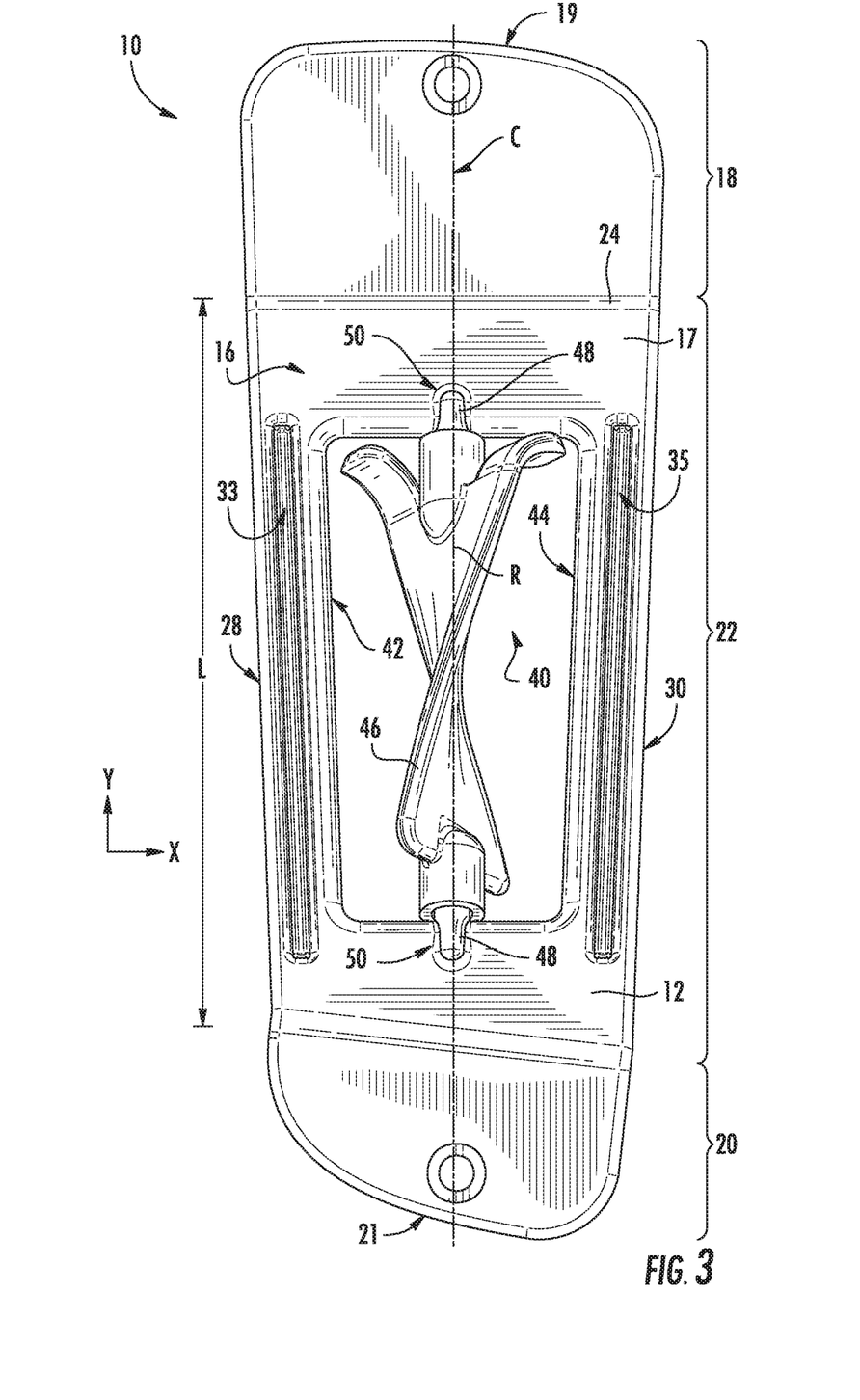
FIG. 3 is a top view of the exemplary flasher of FIG. 1.
Figure 4:
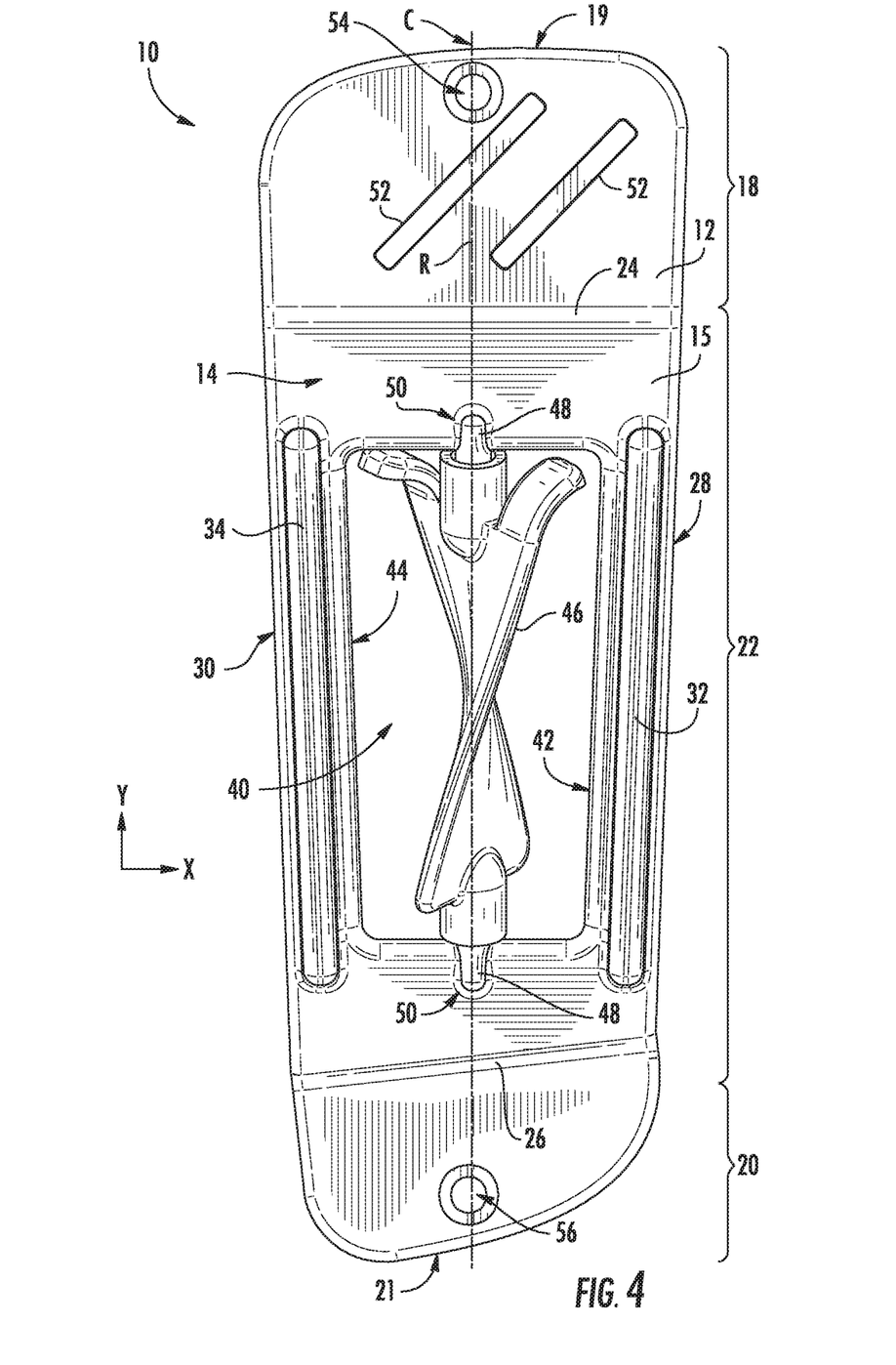
FIG. 4 is a bottom view of the exemplary flasher of FIG. 1.
Figure 5:
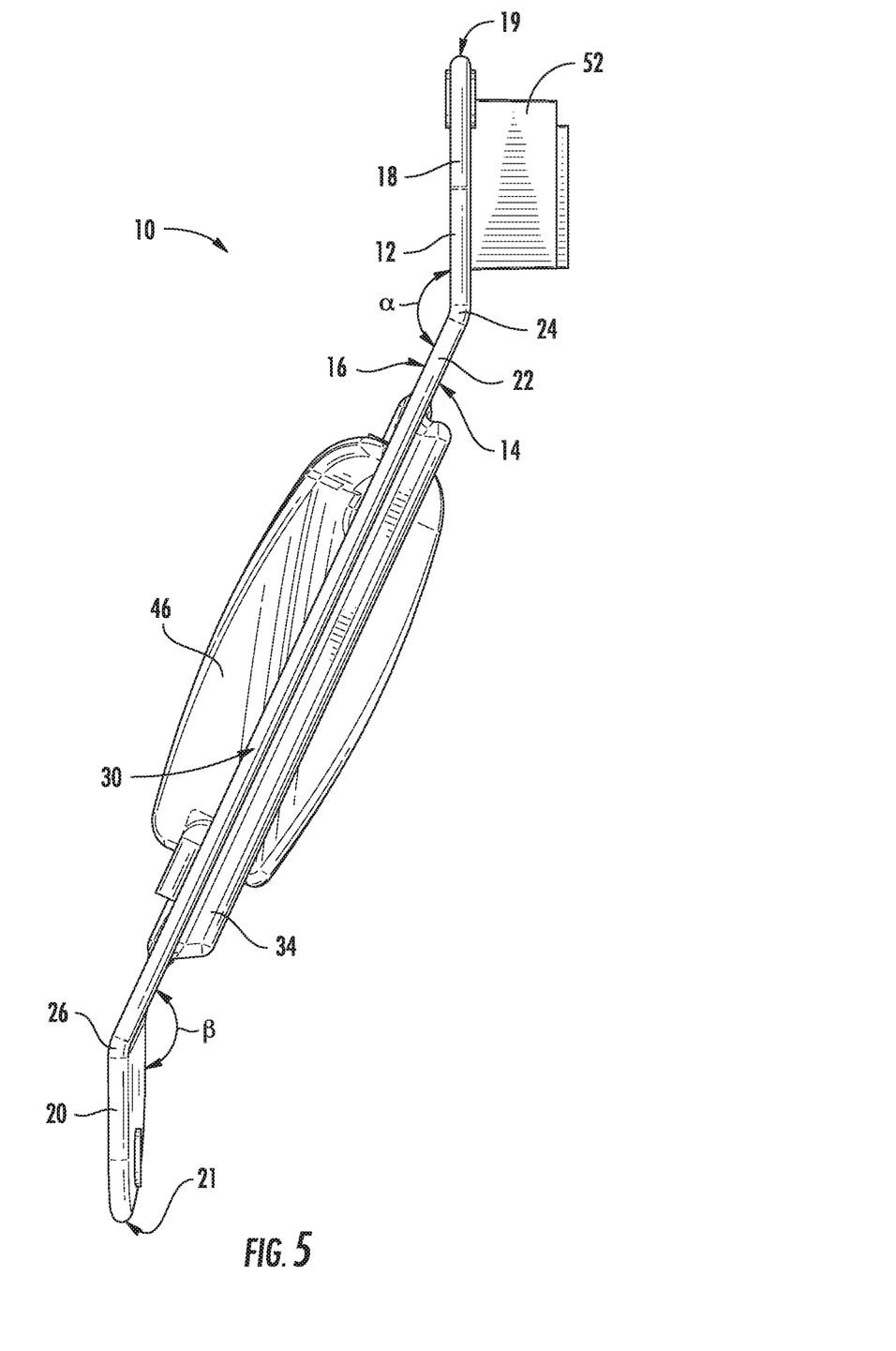
FIG. 5 is a side view of the exemplary flasher of FIG. 1.
Figure 6:
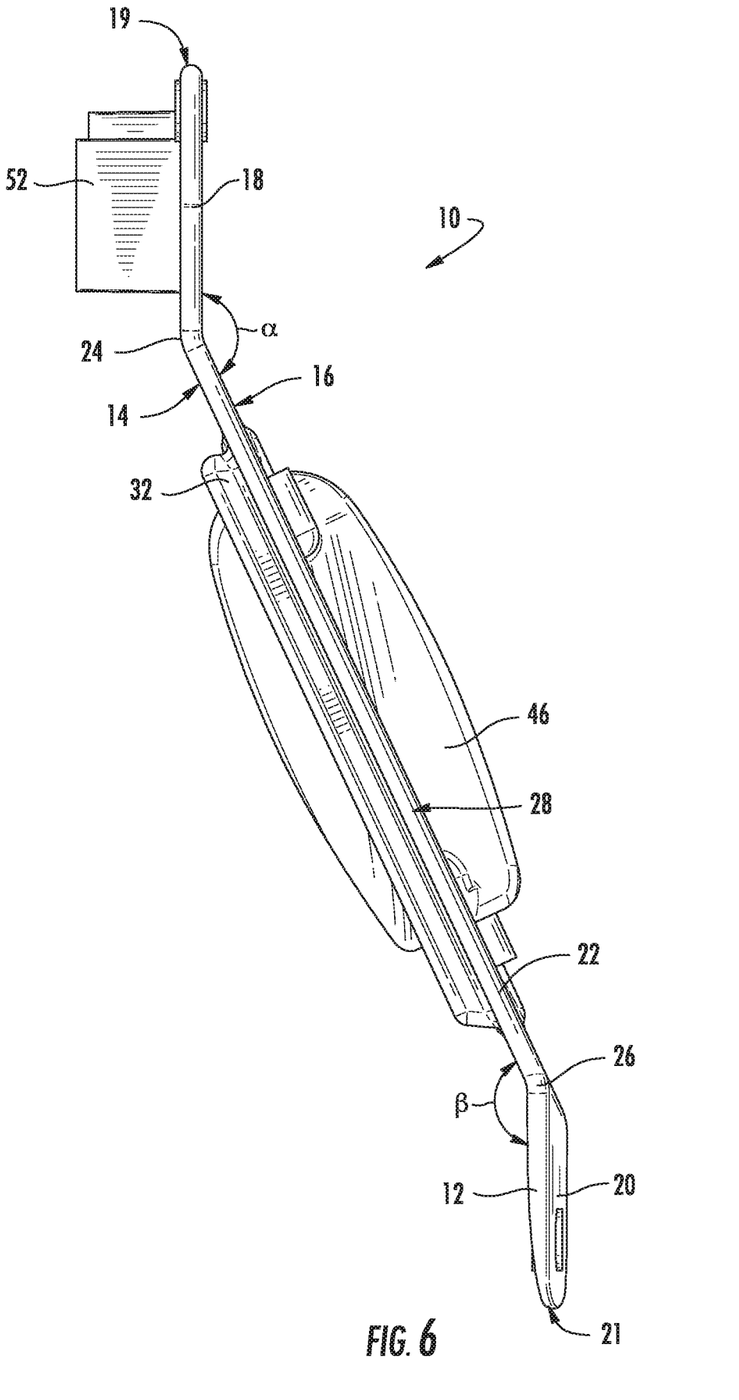
FIG. 6 is another side view of the exemplary flasher of FIG. 1.
Figure 7:
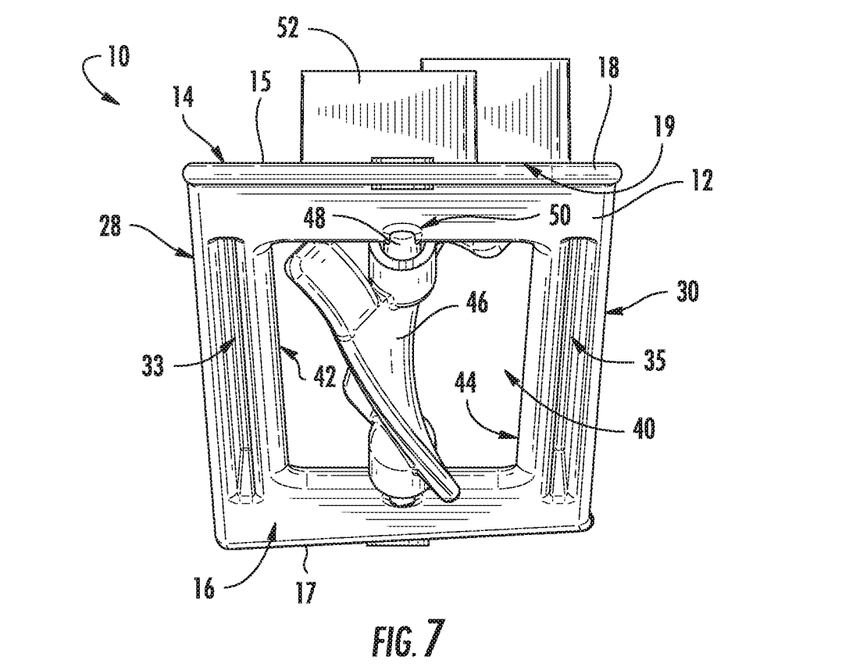
FIG. 7 is a front view of the exemplary flasher of FIG. 1.
Figure 8:
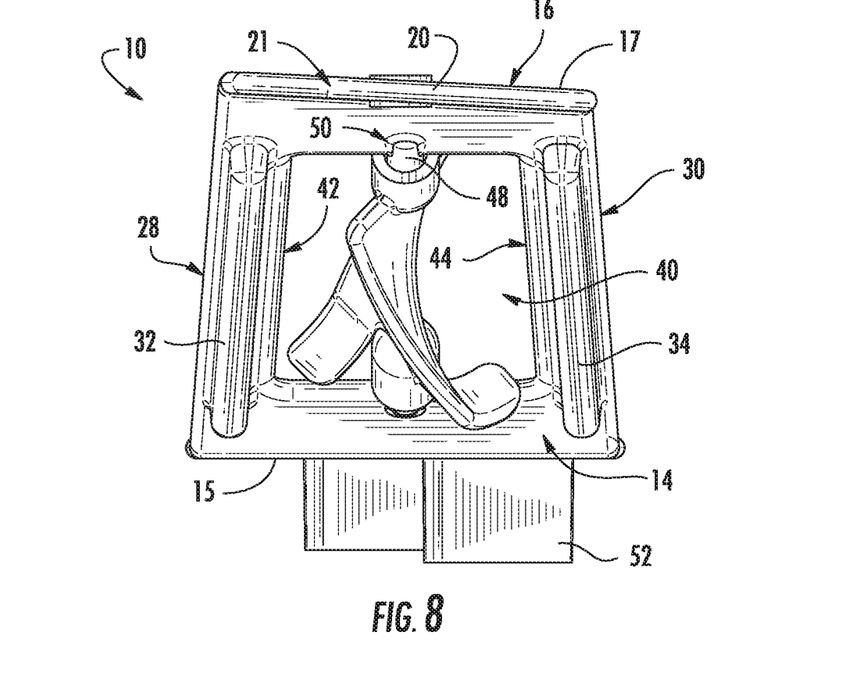
FIG. 8 is a back view of exemplary flasher of FIG. 1.

In the embodiment shown, each of the first rib 32 and the second rib 34 defines a cavity (respectively, a first cavity 33 within the first rib 32 and a second cavity 35 in the second rib 35 as shown in FIG. 3) in the second surface 16. However, in other embodiments, the plate 22 may have a substantially smooth second surface 16 opposite of the first rib 32 and second rib 34.

In one embodiment, the plate 22 may define an opening 40 with the first rib 32 positioned on the plate 22 between the opening 40 (i.e., the first internal wall 42 of the opening 40) and the first side edge 28 of the plate 22. Conversely, the second rib 34 may be positioned on the plate 22 between the opening 40 (i.e., the second internal side wall 44 of the opening 40) and the second side edge 30 of the plate 22.

A spinner 46 may be rotatably attached to the elongated body 12 and positioned within the opening 40 defined within the plate 22. For example, the spinner 46 may be rotatable with respect to the elongated body 12 around a rotational axis R extending in the longitudinal direction y, such as extending along the center line C of the plate (see FIGS. 3 and 4). In the embodiment shown, the spinner includes a pair of pins 48 positioned along the rotational axis R and rotationally positioned within a respective hole 50 within the plate 22 defining the opening 40. The spinner 46 may have any combination of blades, hubs, etc. as desired, and may have surface decorations (e.g., reflective materials, designs, coloring, etc.) as desired.

The flasher 10 may also include at least one tab 52 extending from the leading lip. In the embodiment shown, the tab(s) 52 extend from the first surface 14 of the leading lip 18 such that the tab(s) 52 and the ribs 32,34 extend away from the elongated body 12 along the same surface (i.e., the first surface 14). Generally, the tab(s) 52 interact with water to add circular movement to the flasher 12 as the flasher 12 is pulled through water, particularly at relatively lower speeds so as to broaden the effective range of trolling speeds. In particular embodiments, the tab(s) 52 may be positioned at an angle of about 30° to about 60° with respect to the longitudinal direction L of the flasher 10 (e.g., about 40° to about 50°).

The leading lip 18 includes a first aperature 54 therein for connecting to a fishing line. Conversely, the trailing lip 20 includes a second aperture 56 therein for connecting to a leader line that connects to a bait or lure. Thus, when fishing, the bait/lure trails the flasher 10 as they are pulled through the water.

Methods of fishing are also generally provided. In one embodiment, the method of fishing may include attaching the leading lip of a flasher (such as shown in FIGS. 1-8) to a fishing line; attaching the trailing lip of the flasher to a leader line with the leader line being connected to a fishing bait or lure; and pulling the fishing line through a body of water.

This written description uses exemplary embodiments to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A flasher, comprising:
   an elongated body defining a first surface on a first side of the elongated body and a second surface on a second side of the elongated body that is opposite of the first side, wherein the elongated body has:
      a leading lip defining an upstream edge of the elongated body,
      a trailing lip defining a downstream edge of the elongated body, and
      a plate positioned between the leading lip and the trailing lip, wherein the plate defines a length in a longitudinal direction along a center line of the plate from the leading lip to the trailing lip, wherein an opening is defined within the plate of the elongated body;
   a first rib elevated above the first surface of the plate and extending in a first direction that is within 10° of the longitudinal direction, wherein the first rib extends about 65% to about 95% of the length of the plate, wherein the first rib is positioned on the plate between the opening and a first side edge of the plate;
   a second rib on the plate and extending in a second direction that is within 10° of the longitudinal direction, wherein the second rib extends about 65% to about 95% of the length of the plate, wherein the second rib is positioned on the plate between the opening and a second side edge of the plate; and
   a spinner rotatably attached to the elongated body and positioned within the opening defined within the plate.

2. The flasher of claim 1, wherein the first direction is substantially parallel to the longitudinal direction.

3. The flasher of claim 1, wherein the second direction is substantially parallel to the longitudinal direction.

4. The flasher of claim 1, wherein the second rib is elevated above the first surface.

5. The flasher of claim 4, wherein the first rib and the second rib have respective heights above the first surface that are substantially identical to each other.

6. The flasher of claim 4, wherein the first rib and the second rib have respective shapes that are substantially identical to each other.

7. The flasher of claim 1, wherein each of the first rib and the second rib defines a cavity in the second surface.

8. The flasher of claim 1, wherein the spinner is rotatable with respect to the elongated body around a rotational axis extending in the longitudinal direction.

9. The flasher of claim 1, wherein the rotational axis of the spinner extends along the center line of the plate.

10. The flasher of claim 1, wherein the spinner further comprises a pair of pins positioned along the rotational axis, and wherein the pins are rotationally positioned within a respective hole within a surface defining the opening of the plate.

11. The flasher of claim 1, further comprising:
    at least one tab extending from the leading lip.

12. The flasher of claim 11, wherein the at least one tab extends from the first surface of the leading lip.

13. The flasher of claim 11, wherein the at least one tab is positioned an angle of about 30° to about 60° with respect to the longitudinal direction.

14. The flasher of claim 1, wherein the leading lip defines a first aperture therein, and wherein the trailing lip defines a second aperture therein.

15. The flasher of claim 1, wherein the elongated body has a length-to-width ratio of about 3:1 to about 10:1.

16. A method of fishing using the flasher of claim 1, the method comprising:
    attaching the leading lip of the flasher to a fishing line;
    attaching the trailing lip of the flasher to a leader line, wherein the leader line is connected to a fishing bait or lure; and
    pulling the fishing line through a body of water.

17. A flasher, comprising:
    an elongated body defining a first surface on a first side of the elongated body and a second surface on a second side of the elongated body that is opposite of the first side, wherein the elongated body has:
       a leading lip defining an upstream edge of the elongated body,
       a trailing lip defining a downstream edge of the elongated body, and
       a plate positioned between the leading lip and the trailing lip, wherein the plate defines a length in a longitudinal direction along a center line of the plate from the leading lip to the trailing lip, wherein an opening is defined within the plate of the elongated body;
    a first rib elevated above the first surface of the plate and extending in a first direction that is within 10° of the longitudinal direction, wherein the first rib is positioned on the plate between the opening and a first side edge of the plate;

a second rib on the plate and extending in a second direction that is within 10° of the longitudinal direction, wherein the second rib is positioned on the plate between the opening and a second side edge of the plate; and a spinner rotatably attached to the elongated body and positioned within the opening defined within the plate.

18. The flasher of claim 17, wherein each of the first rib and the second rib defines a cavity in the second surface.

\* \* \* \* \*